Oct. 21, 1952 F. R. SAXBY 2,614,489
REMOTE-CONTROL RECORDING MECHANISM
Filed Aug. 25, 1948 4 Sheets-Sheet 2

*Inventor*
FRANK REGINALD SAXBY
BY Earl Beust
*Attorney*

Patented Oct. 21, 1952

2,614,489

UNITED STATES PATENT OFFICE 2,614,489

REMOTE-CONTROL RECORDING MECHANISM

Frank Reginald Saxby, Eastcote, England, assignor to The National Cash Register Company, Dayton, Ohio, a corporation of Maryland Application August 25, 1948, Serial No. 46,128
In Great Britain September 3, 1947

8 Claims. (Cl. 101—95)

This invention relates to recording mechanisms, and in particular to such mechanisms in which the recording of data on a record material inserted therein is controllable from a remote source.

One example of the use of such a device is in a credit sanction system. In such devices there are two main units—a recording unit and a sanctioning unit. When a customer desires credit, the clerk at the counter telephones through to the clerk in charge of an appropriate alphabetical ledger section handling the client's account, and enquires if the client's credit is good for the amount of the current purchase. The record of this purchase, at the time of the enquiry, is made out on the usual type of bill for goods sold.

When the counter clerk telephones through to the sanction clerk, he places this bill in a chute in the recording instrument.

When the sanctioning clerk has ascertained that the client is, in fact, good for the amount of the current purchase, he depresses a button which closes a circuit to the recording unit and operates the main operating mechanism thereof.

This causes the bill to be punched with an authorizing symbol, such as a series of holes, or other pattern, and prints the following information on the bill: consecutive number of the sanction, date, and a number identifying the recording instrument which has dealt with the transaction.

Should the client not be granted the credit, the sanctioning clerk informs the counter clerk to this effect over the telephone, and the latter withdraws the bill from the recorder and informs the client that credit cannot be granted. The withdrawing of the bill breaks an electrical circuit from the sanction point to the recorder and thereby renders it impossible for the sanctioning clerk to cause operation of the printing and perforating mechanisms.

In a known form of such an authorizing, or credit sanctioning, device, such as that disclosed in prior United States patent to Dorsey et al., No. 1,321,900, the energy for performing the recording action is derived entirely from a solenoid, which is adapted to be operated from a remote source, and has necessitated the use of comparatively heavy currents and equivalent circuit wiring and apparatus.

The present invention has for its main object to provide arrangements whereby the control of the recording mechanism from the remote source necessitates the use of only relatively light current apparatus.

According to one aspect, the invention comprises a device for producing a visible record, including a main source of power for operating the device, manually operable means adapted to energize said source of power for operation, means for restraining said source in energized condition, and means operable from a remote location to disable said restraining means whereby the power is released to operate the recording device.

According to another feature, the invention comprises a device for producing a visible record, including a spring motor for operating the device, manually operable means adapted to stress said spring motor, latching means adapted to hold the motor in stressed position, and means adapted to be operated from a remote location so as to disable the latching means whereby the spring motor is released to operate the recording device.

The above and other, subsidiary, features of the present invention will be more fully understood from the following description taken in conjunction with the accompanying drawings, which described and illustrate, by way of example only, one manner of carrying out the invention.

The recording device of the present invention, according to the preferred embodiment, includes the following main parts:

(a) Framework, including left frame, centre frame, upper and lower right frames, and cross rods.
(b) Cabinet.
(c) Standard telephone dialling attachment.

(d) Main operating key and slide.
(e) Punch assembly.
(f) Slip feeler.
(g) Printing wheels and printing hammer.
(h) Ink ribbon mechanism.
(i) Consecutive numbering device.
(j) Release magnet.

Before proceeding to a detailed description of the above parts, a general description will be given of the operation of the device.

General operation

In the present embodiment, by way of example only, the recorder is shown, as stated above, associated with a credit sanction system.

The counter clerk makes out a bill for the transaction for which credit is being sought, dials, on the telephone attachment, the number of the sanction clerk handling the particular ledger section into which the name of the client falls, inserts the bill into the recorder, and fully depresses the operating key. He then enquires if this particular customer is good for the amount of credit on the bill. The ledger clerk refers to the ledger and, if the account is all right, presses a sanctioning button. This causes a circuit to be closed to the magnet, the armature of which releases a pawl normally retaining the main slide in cocked position. A strong spring now causes the main operating lever, and the other parts of the recorder, to be returned to home position.

During this restoration, a consecutive number operating pawl is retracted in readiness for another operation of the consecutive number. It should be mentioned that the operation of the pawl to advance the consecutive number takes place upon manual operation of the main operating key.

Also during the restoring movement a print is taken on the bill, consisting of the consecutive number of the sanction, the date, and a number identifying the recorder which handled the transaction. At this time the punch assembly is operated to punch a pattern of perforations in the bill which will indicate that official sanction has been given for the credit of this particular bill to be granted.

Insertion of the bill into the recorder and full depression of the main operating key causes a circuit to be closed to a red warning lamp at the sanctioning point to inform the sanctioning clerk that these necessary operations have been performed. The circuit is so arranged that depression of the sanctioning button will be ineffective to release the magnet until the above two operations have been performed to complete the circuit.

A box is provided, projecting through the cabinet for easy removal, which will accommodate the punchings from the punching unit.

Should the ledger clerk find that the account in question is not good for the amount of credit currently required, he will inform the counter clerk to this effect over the telephone unit, and will refrain from depressing his sanctioning button.

The counter clerk now removes the bill, and the cocked main operating key will remain in cocked position ready for the next bill to be handled. Withdrawal of the non-sanctioned bill, through the medium of the slip feeler, causes the circuit to the sanctioning officer's button to be opened and any depression of his sanctioning button will not therefore be effective to operate the recorder.

In another form of the recorder, if the credit is not sanctioned, the counter clerk will depress a release button thereon, which releases the bill from a holding means, the bill is then withdrawn, and the pawl for the main slide is concurrently released and, together with the other parts of the apparatus, is restored to home position. The depression of the recorder release button disables the retracting means for the operating pawl of the consecutive numbering mechanism and therefore the consecutive number wheels will not be advanced at the next operation of the main operating key. Depression of the release button also disables the printing mechanism, punch, and ribbon feed means.

A detailed description of the recording device will now be given.

Figure 1:
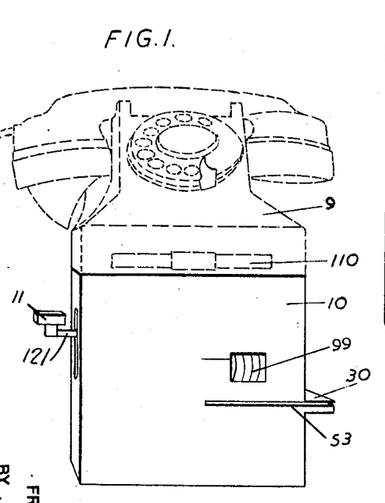
Fig. 1 is a front view of the recorder assembled in its housing together with the telephone unit.
Figure 5:
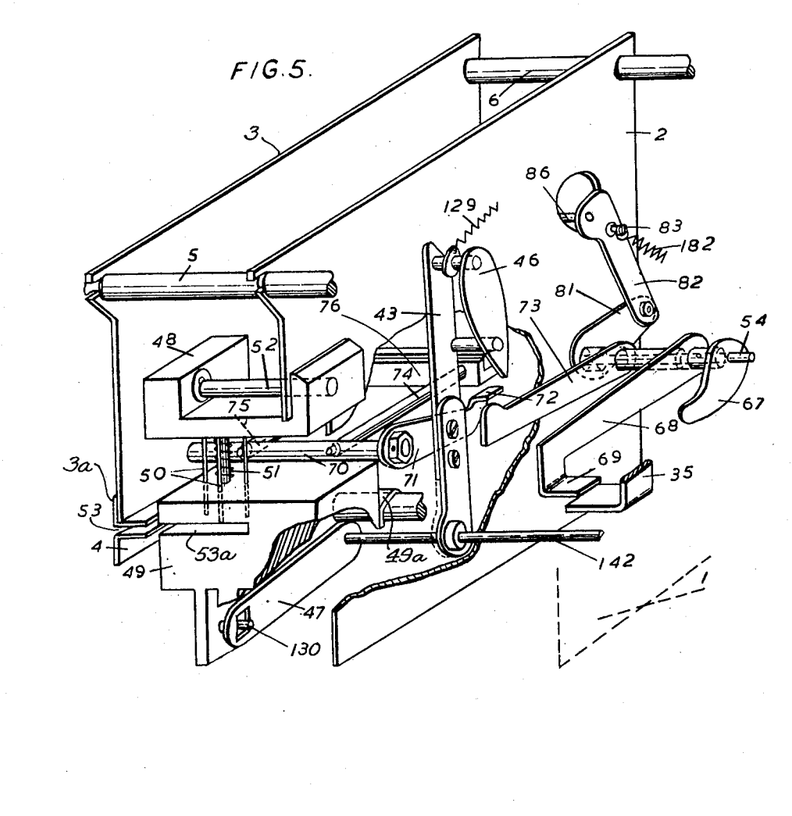
Fig. 5 is a fragmentary perspective view, seen from the rear, of the centre and right side frames and certain parts associated therewith.
Figure 6:
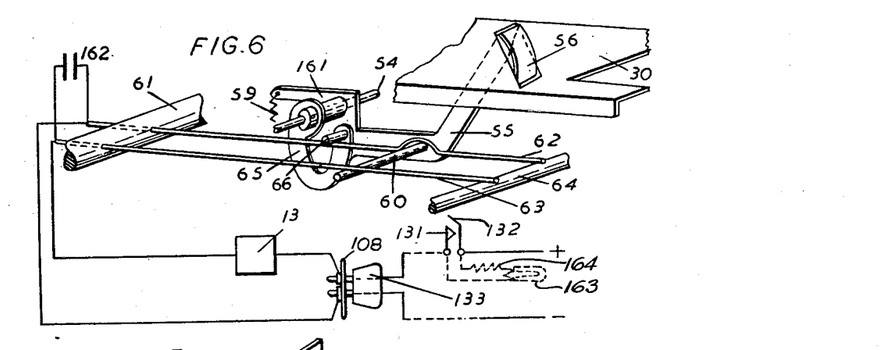
Fig. 6 is a perspective view of the slip feeler showing its relationship to the contact wires for the remote control circuit.

The mechanism of the recorder is supported in three main frames, a left side frame 1 (Figs. 2, 3, 4, 5 and 8), a centre frame 2, and a right side frame comprising an upper section 3 and a lower section 4, the latter being integral with a slip table 30 (Figs. 1 and 6). The frames are tied together with two main cross rods 5 and 6 and other rods. The upper frame 3 has a flange 3a, which, with section 4, forms a chute 53 (Figs. 1 and 5) for the customer's bill which is to be inserted, printed upon and perforated.

An ordinary standard telephone dialling unit 9 (Fig. 1) has dowel pins which fit into appropriate apertures in the rods 5 and 6. A box or housing 10 accommodates the recording unit. The cross rods 5 and 6 are adapted to accommodate grub screws which are suitably adjusted until they cause the recorder to seat squarely on lugs provided in the housing.

A main operating key 11 (Figs. 1 and 3) is secured to one end of a stud 121 projecting through a slot in the casing 10. The other end of the stud 121 is secured to a slide 20 mounted for reciprocating movement on a pair of guides 18, 19 (Figs. 2 and 6) riveted to the frame 1. A slot 140 in the frame 1 permits reciprocating movement of the key 11 and its supporting stud 121.

Pivoted on a stud 150 (Fig. 4) secured to the frame 1 is a segment 15 having a deep notch 151 therein. The supporting stud 121 for the key 11 extends through this notch and thus causes the segment 15 to be rocked counter-clockwise and clockwise, respectively, as the key 11 is reciprocated downwardly and upwardly. In the normal position, and also as the segment rocks clockwise and counter-clockwise, the full portion thereof completely conceals the slots 140 in the side frame 1 so as to prevent any improper manipulation of the parts at any time, even during the time that the key 11 is being operated in the operation of the recording device.

Figure 4:
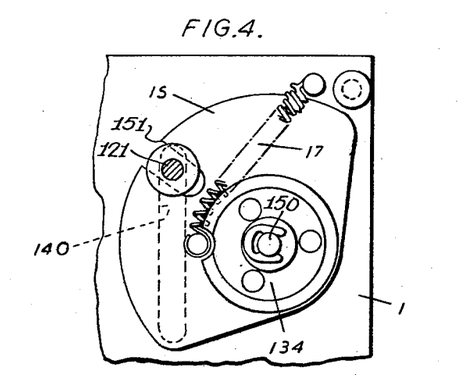
Fig. 4 is a view of the left side plate showing the main operating lever, operating segment, and main operating spring.

Suitably secured to the side of the segment 15 is a disc 134 which has an annular recess therein which is adapted to support and guide a very strong main spring 17 which is anchored at one end to a stud in the segment and at the other end to a stud 16 secured in the left frame 1.

Figure 2:
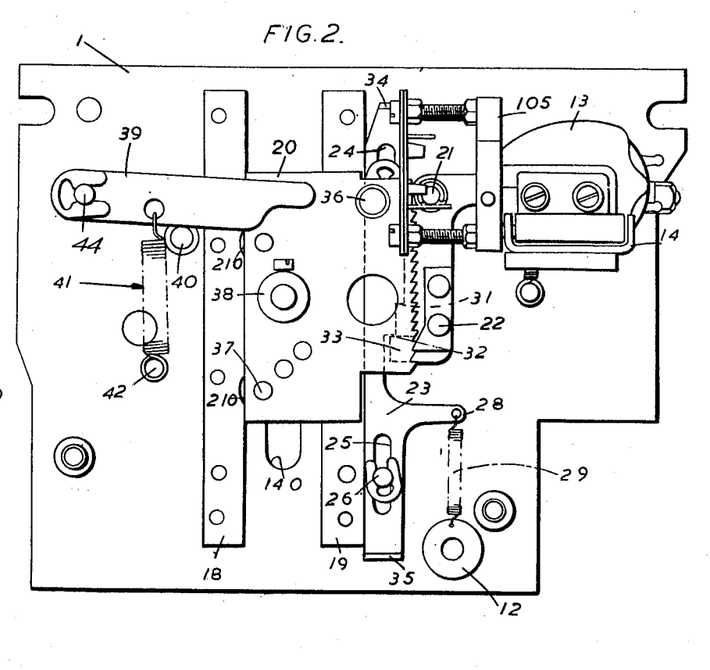
Fig. 2 is a side view of the left frame and certain parts of the mechanism attached thereto.

The slide 20, which is shown in partly moved position in Fig. 2, is guided for movement along the guides 18 and 19 by means of four annularly recessed discs, as 210 (Fig. 2), secured thereto, the annular grooves being of such a width as to engage the edges of the guides 18 and 19 for easy movement of the slide up and down.

One edge of the slide 20 (Figs. 2 and 3) is toothed to cooperate with a full stroke pawl 22 rockably mounted on a stud 21 on the inside of the left frame 1. A spring 220 (Fig. 3) secured to an extension 107 on the pawl 22 and a stud in the frame 1 maintains the nose of the pawl resiliently in engagement with the teeth in the slide 20. It will be clear that, as the key 11 is depressed and the slide 20 moves downwardly, the nose of the pawl 22 will ratchet in and out of the teeth in the slide to prevent return movement thereof until the slide has been released as will be hereinafter described. The pawl 22 thus functions as a full-stroke device.

A pitman 23 (Figs. 2 and 3) has slots 24 and 25 therein, which cooperate with studs 26, only one of which is shown, secured in the left frame 1. A side projection 28 on the pitman 23 has secured thereto a spring 29, the other end of the spring being anchored to a washer 12 held on a stud on the side frame 1.

Figure 3:
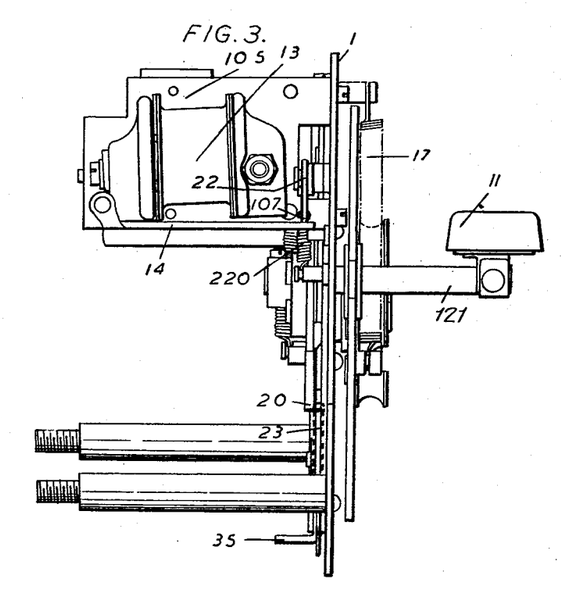
Fig. 3 is a rear view of the left side frame showing the release magnet and certain other parts attached to the frame.

In the right-hand edge of the pitman 23 are two steps 31 and 32, the lower step 32 cooperating with a foot 33 on the pawl 22 to maintain the pitman 23 normally in its uppermost position against the action of the spring 29. The ratcheting movement of the pawl 22, as the slide 20 moves downwardly, is not sufficient to disengage the foot 33 of the pawl from the step 32 in the pitman 23.

An electro magnet 13 (Figs. 2 and 3) is secured to the left side frame 1 and, when this magnet is energized, as will be later described, the extension 107 of the pawl 22 is engaged by an armature 14 of the magnet 13 which lies beneath said extension. This will cause the pawl 22 to be rocked counter-clockwise as seen in Fig. 2, whereby the spring 17 (Figs. 3 and 4) will return the key 11 and the slide 20 to normal or upper position.

When the pawl 22 is rocked, as just described, the foot 33 thereof is removed from engagement with the step 32 on the pitman 23. The latter is thereupon immediately moved downwardly by its spring 29 until the upper step 31 engages with the foot 33 of the pawl 22. This causes the pawl 22 to be rocked further on its stud 21 whereby its nose is removed out of the path of the teeth in the slide 20, permitting the latter to be returned freely by the main spring 17 when the magnet 13 is energized. The upper step 31 cooperates with the foot 33 of the pawl 22 to maintain the pawl out of the path of the teeth on the slide 20 until the slide has been completely restored.

The pitman 23 (Fig. 2) is provided with an upper lug 34 and a lower lug 35. The upper lug 34 is contacted by the upper edge of the slide 20, when the latter is returned, thereby returning the pitman 23 to normal position. This return movement of the pitman 23 is a sharp one and at this time the lower lug 35 operates a printing mechanism as will be hereinafter described.

The slide 20 has a bush 38 at the left hand side and this bush is adapted to cooperate with a cushioning lever 39 mounted on a stud 44 in the left frame 1. Anchored to the lever is a strong spring 41, the other end of which is fastened to a stud 42 in the frame 1, the spring normally maintaining the lever against a stud 40 on the frame 1. When the slide 20 is returned by the main spring 17, the bush 38 strikes the under surface of the lever 39 and this cushions the shock. In its return movement, the slide 20 will momentarily overthrow a slight amount past home position to move the pitman 23 far enough upwardly to insure that the step 31 moves above the latch 22 and allows the latch to return into position to engage the teeth on the slide 20.

A roller 36 projects from the top right-hand corner of the slide 20 and a stud 37 projects from the lower left-hand side of the slide.

A shaft 142 (Fig. 5) is freely mounted in the frames 1 and 2. Fast on this shaft is an upwardly extending lever 43 composed of an upper and a lower part, secured by nuts and bolts working in enlarged holes to allow for relative initial adjustment to vary the throw to be given to a perforating mechanism to be later described. Secured to the upper end of the lever 43 by two studs is a cam 46 adapted to cooperate with the roller 36. Fastened to the top end of the lever 43 is a spring 129 the other end of which is secured to the cross rod 6.

As the slide 20 moves downwardly, upon manual operation of the key 11 (Figs. 1 and 3), the roller 36 cooperates with the right side of the cam 46, causing the lever 43 to be rocked counter-clockwise as seen in Fig. 5. This movement of the lever 43 is an idle one. When the slide 20 nears the end of its downward stroke, the roller 36 passes beyond the nose of the cam 46, whereupon the spring 129 returns the lever 43 slightly clockwise, that the roller 36 will now contact the opposite face of the cam 46. Subsequent return movement of the slide 20, through the roller 36, will cause the lever 43 to be rocked clockwise to normal position.

Fast on the left-hand end of the shaft 142 is a punch operating lever 47 having an enlarged slot therein engaging a pin 131 in a die plate 49. The die plate is adapted to be reciprocated by the lever 47 and is guided for vertical reciprocation by pins 50 extending from a punch frame 48, the largest of these pins forming the main guide and being encircled by a spring 51 compressed between the die plate and the punch frame. The spring 51 counteracts the pull of the spring 129, so as to maintain the die plate depressed and the lever 43 in a floating position, so that it can be rotated in either direction, as aforementioned. The die plate 49 has a slot 53a, alined with the chute 53, to permit the insertion of a bill into the plate to be perforated by the pins 50, which, on the plate being raised, extend through the slot 53a. The punch frame 48 is mounted for a slight lateral movement on a short shaft 52 mounted in the centre frame 2 and the upper right side frame 3. This lateral movement allows the punching unit to be self-aligning, thus preventing strain on the smaller pins 50.

Under normal circumstances, the spring 129 maintains the bottom of the slot in the lever 47 in contact with the pin 130 in the die plate. The slot in the lever 47 permits an idle movement of the lever relatively to the pin 130 when the lever 43 is rocked counter-clockwise initially, as explained above. When the lever 43 returns slightly clockwise as referred to above, the lever 47 rocks similarly until the bottom edge of the slot therein is contacting the stud 131.

Full return movement of the lever 43 will cause the lever 47 to move the die plate 49 upwardly, causing the pins 51 to pierce a bill which has been previously placed in the chute 53 and extends through a corresponding slot 53a in the die plate.

Just as the slide 20 nears the end of its return movement, the roller 36 passes off the top edge of the cam 46, and the springs 129 and 51, acting in combination, cause a partial return movement of the lever 43 and the die plate 49 in the opposite direction whereby the die plate 49 is restored to normal position. This restoration of the die plate 49 is permitted by the enlarged slot in the lever 47.

A foot 49a on the die plate 49 limits return stroke thereof by contact with a cross rod secured to the frame 2.

Freely mounted in the plates 1, 2 and 3 is a shaft 54 (Figs. 5 and 6) adapted to support the printer operating mechanism.

Pivotally mounted on the shaft 54, between the centre frame and the bottom right side frame 4, and below the table 30, is a slip feeler 55, having an elongated lug 56 at the upper end which projects through a slot in the table 30, into the bill chute 53. A light spring 59 is anchored between a stud on the centre frame 2 and a tail on the feeler 55, and this spring 59 normally maintains the feeler 55 so that the lug 56 projects through into the chute 53.

Mounted in a bush 61 of electrically insulating material extending between the frame 2 and the frame 4 are a pair of wires 62, 63 of suitable electrically conductive material. The front end of each of these wires normally lies above a rod 64, of suitable electrically conductive material, which is secured to but insulated from frame 2 and extends between the frames 2 and 4.

The wires 62 and 63 can be controlled to engage the rod 64 in the following manner to complete a circuit for the tripping magnet, which circuit also causes a signal to be given at the control or sanction station.

Fast on the shaft 54 adjacent the slip feeler 55 is a short curved arm 65 having projecting therefrom a stud 66 of electrically non-conductive material, which lies in the same vertical plane as the wire 62.

Fast on the other end of the shaft 54 is an arm 67, which is adapted to be contacted by the stud 37 (Fig. 2) on the plate 20 as the latter reaches the terminus of its downward stroke. This contact of the stud 37 causes the shaft 54 to be rocked counterclockwise as viewed in Fig. 5 and clockwise as seen in Fig. 6, whereupon the stud 66 contacts the wire 62, forcing it down against the rod 64. Accordingly, the wire 62 will be engaged with the rod 64 when the main operating key 11 has been fully depressed.

A long stud 60 of electrically insulating material projects from approximately the mid portion of the feeler and extends under the wire 63 so as to hold the wire out of engagement with the rod 64 as long as the lug 56 has not been depressed by an inserted bill. When a bill is inserted into the chute 53, it moves the lug 56 of the slip feeler 55 downwardly, causing the feeler to pivot clockwise as seen in Fig. 6, lowering the stud 60, and permitting the other wire 63 to descend into contact with the rod 64. It is to be noted that the wire 62 is so shaped adjacent the rod 60 as to be free from the control thereof.

The engagement of both wires 62 and 63 with the rod 64 completes a circuit shown in this figure, which circuit leads to the control or sanction location, and causes a lamp to be illuminated. The clerk at this location knows that the operating key 11 has been fully depressed and also that a bill has been placed in the recorder. The contact of the wires with the rod 64 also partially completes a circuit to the sanction point which is finally completed by the clerk thereat pressing a key or button to complete a circuit to the magnet 13 which thereupon releases the slide 20 for return to home position. As has been explained, such return of the slide operates the perforator and also operates a printing mechanism now to be described.

Pivotally mounted on the shaft 54 is a yoke 68 (Fig. 5) having a lug 69 on one arm thereof lying in the path of the lug 35 on the pitman 23.

When the magnet is energized, as referred to above, and the slide 20 and pitman 23 make their sharp return movements, the lug 35, contacting the lug 69 to rock the yoke 68 a short distance clockwise, as seen in this figure, causes an arm 73 of the yoke to contact a lug 72 on an arm 71 fast on a short shaft 70 rockably mounted in the frame 2 and the frame 3.

Secured on the shaft 70 are a pair of long studs 74 and 75 connected, at their other ends, to a printing platen 76. The platen 76 is adapted to cooperate with type wheels 77, 78 and 79, to be later described, through an opening in the paper table 30.

A short shaft 192 (Fig. 7) extends between the plates 2 and 3 and rotatably supports an ink supply drum 90 which supports and inks a ribbon 91. The ribbon 91 is endless and is first looped round the ink supply drum. From thence it is led under a stirrup 191 in the frames 2 and 3, under guide pins 194 and 198 and forward under the type wheels 77, 78 and 79, around another stud 193 fixed between the frames 2 and 3 and then doubles back under the type wheels, over another stud (not shown) and so round the lower face of the ink drum. Thus, between the type wheels 77, 78 and 79, and the platen 76, there is a double thickness of ink ribbon 91.

Figures 7, 8:
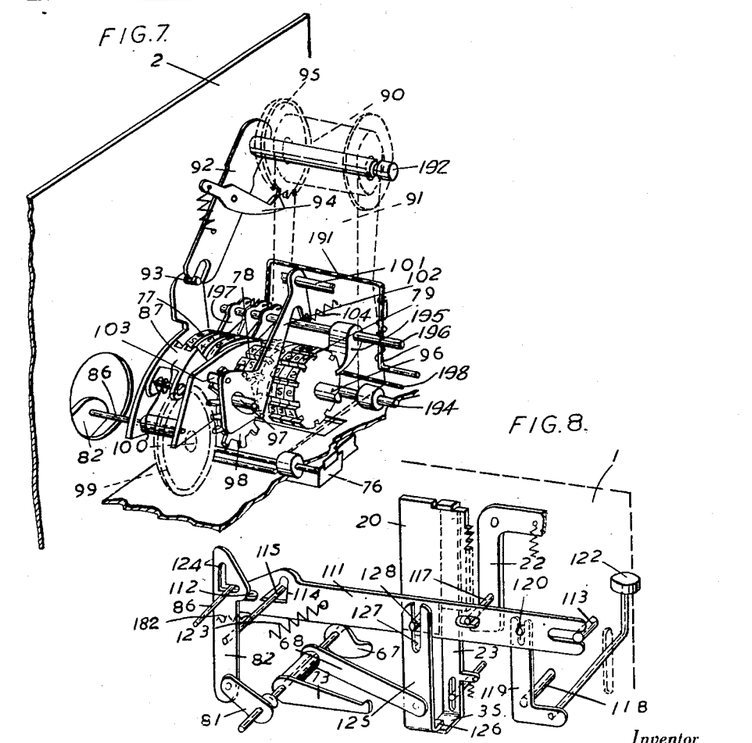
Fig. 7 is a perspective view of the consecutive number wheels, the operating pawl therefor, and the ribbon feeding means.
Fig. 8 shows a modified form of the invention.

The stirrup 191 is spring-urged and engages the ribbon 91 from the rear to maintain tension thereon.

When the yoke 68 rocks the arms 71, through arm 73 and lug 72, as stated above, it will be seen that the printing platen forces the inserted bill against the double ribbon 91 and the type wheels 77, 78 and 79, to take an impression from the latter on to the bill.

Pivoted on the shaft 192 (Fig. 7) is a ribbon feed lever 92 bifurcated to embrace a pin 93 on a consecutive number feed pawl 87 described below. Pivoted on the lever 92 is a pawl 94 spring-urged into engagement with a ratchet 95 integral with the ink supply drum. Thus it will be seen that, each time the consecutive number feed pawl 87 is operated, the lever 92 will be rocked to feed the ribbon one step. A back-check, not shown, can be used with the ratchet 95 to prevent retrograde movement of the ribbon 91.

Secured to shaft 54 is an arm 81, to which is pivotally attached an upwardly-extending link 82 urged clockwise (Fig. 5) by a spring 182 secured between a stud 83 in the link and a fixed stud in the frame 2. The link 82 at its free end has a pin 86 which extends through an opening in the frame 2 and is connected to the usual multi-pronged operating pawl for the consecutive number wheels 77. The usual form of pronged operating pawl and deep-notch transfer mechanism are provided for the consecutive number wheels 77.

When the key 11 (Figs. 1 and 3) is fully depressed, the slide 20, near the end of its downward movement, will cause the stud 37 to contact the arm 67 (Fig. 5), rocking the shaft 54 counter-clockwise as seen in Fig. 5. This will cause the arm 81 to move similarly, whereupon the lever 82 will rise, carrying the stud 86 therewith, so as to cause the pawl 87 to move clockwise, as seen in Fig. 7 to advance the lowest order consecutive number wheel 77 one step.

When the slide 20 (Fig. 2) returns upwardly, the arm 67 is released by the stud 37, and the spring 182, (Fig. 5) anchored to the stud 83 in the lever 82 and the stud in the frame 2, draws the link 82 downwardly, which rocks the shaft 54 clockwise. This downward movement of the lever 82 retracts the pawl 87 ready for its next operating stroke.

The printing wheel unit includes the consecutive number wheels 77 just described, a set of date wheels 78, and a set of numbering wheels 79 adapted to be set to an individual number identifying the recorder or for other purposes. These latter wheels are manually adjusted and then held by an aligner 195 secured for lateral sliding movement on a shaft 196 which supports back check pawls 197 for the consecutive number wheels.

The type wheel assembly is supported on a short shaft 96 extending between the frames 2 and 3 (Fig. 7). Rotatably mounted on a stud 97 secured in the frame 3 are intermediate wheels 98, one meshing with each of the date wheels 78. These intermediate wheels 98 also mesh with visible date wheels 99 (Figs. 1 and 7) mounted on a shaft 100 extending between the frames 2 and 3.

Upon the operator setting the visible wheels 99, the intermediate wheels 98 transmit said setting to the date printing wheels 78.

Pivoted on a stud 101 extending from the frame 3 is a series of bell cranks 102, one arm of each of which carries a roller 103 engaging between adjacent teeth of a related intermediate wheel 98. The other arm of each of the bell cranks 102 has secured thereto a light spring 103, the other end of which is anchored to a rod (not shown) extending between frames 2 and 3. Thus these bell cranks 102 act as aligners for the intermediate wheels 98 and therefore for the date wheels 78.

Mounted on a plate 105 (Figs. 2 and 3) secured between the frames 1 and 2, near the top thereof, is the electromagnet 13 of suitable type, the input leads to which are connected to a remote source of control. The armature 14 of the magnet 13 is of a plate type pivoted at one end to the magnet. The other end of the armature plate 14 underlies the tail 107 of the pawl 22 as seen in Fig. 3.

When the authorizing clerk depresses a button, contacts 131 and 132 will be closed to short-circuit the lamp 163 and the resistor 164 so that the current in the circuit will increase and be sufficient to energize the magnet 13 (Figs. 2 and 3), the armature 14 thereof, upon attraction, contacting the tail 107 of the pawl 22, rocking the latter to release the slide 20 which returns upwardly, operating the hammer 76 (Fig. 5), retracting the consecutive number pawl 87 (Fig. 7) and advancing the ribbon 91 one step.

A plug base 108 (Fig. 6) secured to the magnet 13 (Fig. 2) is adapted to accommodate a plug 133 (Fig. 6) carrying the leads to the telephone unit and remote control station.

A condenser 162 is conveniently affixed to the framework of the machine and is connected across the wires 62 and 63 to absorb the surge in the current upon the opening thereof, through the inductance of the electromagnet 13, thereby preventing sparking at the contact-making points of the wires, and also preventing external interference such as might be caused through the opening of an inductive circuit.

Inside the die plate 49 (Fig. 5) is a sloping platform down which the punchings from the inserted bills pass into a convenient receptacle which is removable from the recorder. An opening may be provided in the container so that, if the operator forgets to empty it, the excess punchings will spill out of the container. The two main cross rods of the machine accommodate grub screws, the lower ends of which rest on ledges in the housing 10 (Fig. 1), the screws being adjusted until the recorder sits squarely in the housing.

Two long threaded studs (not shown) extend down at right angles through the centre of the main cross rods and screw down into the bottom of the housing.

Four dowel pins on the telephone unit fit into holes in the cross rods.

A bottom plate of the telephone unit has a slot therein with which a latch, slidably mounted on the centre frame, cooperates. After the telephone unit has been fitted to the recorder the holding latch can only be released by inserting a long screwdriver into a normally closed opening in the front of the telephone unit, and pushing the latch to disabled position. This opening in the telephone unit 9 (Fig. 1) is closed by the usual slidable telephone number index plate 110. The latter is fastened to the telephone unit by concealed spring clips.

Modification

A modified form of the invention is shown in Fig. 8, whereby means is provided to enable the counter clerk to release the cocked main operating lever 11 (Figs. 1 and 3) if credit is not to be granted in respect of a particular account under consideration.

In this second embodiment, depression of a release button moves the tail of the full stroke pawl 22 so as to disable the pawl, in the same manner as it would be moved by energization of the release magnet, and thus the parts are restored to normal position in readiness for another cocking stroke. It is also arranged that printing operations are not carried out during such release operations.

Since it is not desired to advance the consecutive number at the next operation, it having already been advanced when the main operating lever was last cocked, means is provided whereby the next operation of the said lever is ineffective to cause such advance. Similarly, means is provided for moving a part of the printing platen operating linkage to inoperative position so that no printing will occur during a restoring operation which was made necessary because no credit sanction was given. Preferably in this modification means is provided, effective, once the main operating lever has been cocked, to prevent withdrawal of the inserted bill until the parts have restored to normal position.

Restoration of the parts to normal will, inter alia, disable the holding means for the bill so that it may be freely withdrawn.

This modification will now be described in detail.

Referring to Fig. 8, slidably mounted on the left frame 1 is a pitman 111 supported by two studs 112 and 113 in said frame. Near the left-hand end of the pitman 111 is an enlarged substantially triangular opening 114 adapted to receive a long stud 115 on the consecutive number operating arm 82. The arm 82 is provided with an L-shaped slot 124 adapted to cooperate with the pin 86 on the consecutive number operating pawl 87. Under normal operating conditions, the components occupy the positions shown, with the pin 86 engaging the horizontal portion of the L-shaped slot in the arm 82, so that the pin 86 is constrained to follow the movements of the arm 82 to advance the consecutive number wheels at each operation of the mechanism. The long stud 115 on the arm 82 moves freely in the right-hand portion of the opening 114 at this time.

Near the centre of the pitman 111 is a slot cooperating with a stud 117 on the pawl 22.

Pivoted on a stud 118 on the left frame 1 is a bell crank 119 bifurcated to embrace a stud 120 in the pitman 111. Fast in the right-hand arm of the bell crank 119 is a manually operable release lever having a button or head 122. It will be clear that depression of the button 122 will rock the bell crank 119 clockwise, causing the pitman 111 to be moved to the right. This movement of the pitman 111, by means of the slot therein and the stud 117, will rock the pawl 22 counter-clockwise to release the slide 20 for return movement under control of the spring 17 (Figs. 3 and 4).

A strong spring 123 (Fig. 8) anchored between a stud on the pitman 111 and a stud in the left frame 1, returns the pitman 111 to the left when pressure on the button 122 is released.

It will be recalled that, when the operating key 11 and the slide 20 were operated, the consecutive number wheels were advanced, but, if this is followed by an operation of the button 122, the slide 20 will be released without a recording of that number actually having taken place.

To overcome this irregularity, it is arranged that the consecutive number wheels will not be advanced on the next operation of the slide 20, as will now be described.

When the pitman 111 is moved to the right, as referred to above, the left hand camming edge of the enlarged opening 114 contacts the pin 115, causing the arm 82 to be rocked clockwise, which alines the vertical portion of the slot 124 with the pin 86, and, when the arm 82 eventually moves downwardly, the pin 86 merely moves into the vertical portion of the slot.

Upon the next operation of the main operating lever 11, the stud 86 will merely ride idly in the vertical portion of the slot 124 without causing any operation of the consecutive number advancing pawl 87 and the consecutive numbering wheels 78 (Fig. 7).

The operating yoke 68 for the printing platen 76 (Fig. 5) has an arm 125 (Fig. 8) pivotally mounted thereon. This arm 125 has a lug 126 thereon adapted to cooperate with the bottom lug 35 on the pitman 23.

The arm 125 has an elongated slot 127 therein which is engaged by a stud 128 in the pitman 111. Thus, when the pitman 111 is moved to the right upon depression of the button 122, the stud 128, cooperating with the slot 127, causes the arm 125 to rock clockwise. When the slide 20 returns home and, near the end of its upward movement, moves the pitman 23 upwardly with it, the lug 35 will not contact the lug 126 since the latter has been moved out of its path of movement, and therefore the printing platen 76 (Fig. 5) will not be operated.

Suitable means may be provided for normally retaining the inserted bill in the chute 53 (Fig. 5) once depression of the main operating key 11 (Figs. 1 and 3) has been commenced, said retaining means being automatically disabled when the parts return to home position, so that the bill may be removed from the recorder.

While the form of mechanism herein shown and described is admirably adapted to fulfill the objects primarily stated, it is to be understood that it is not intended to confine the invention to the forms or embodiments herein disclosed, for it is susceptible of embodiment in various forms all coming within the scope of the claims which follow.

What is claimed is:

1. In a remotely controlled recording device for marking on record material, the combination of recording means to make suitable marks on the record material; operating means for the recording means including a motor in the device adapted to be energized to supply the sole source of operating power in a recording operation and a recording means operating member connected to the motor and displaced from normal position when the motor is energized; means at the device to energize the motor preparatory to each recording operation and to displace the member from normal position; means to retain the member in its displaced position and thereby retain the motor in its energized state; an electromagnet cooperable with the retaining means and operable, when energized, to operate said retaining means to release the member to allow the member to be driven to home position by the motor to cause an operation of the recording means; a circuit extending to the magnet from a remote control point to enable the magnet to be energized and operate the retaining means to allow the motor to drive the member to cause a recording operation, whereby all the power for operating the recording means is stored in the device and only sufficient power to release the retaining means need be supplied from the remote control point; blocking means retained in normal unblocking position by the retaining means until the retaining means is operated by the electromagnet; means for moving the blocking means to blocking position relative to the retaining means when the blocking means has been released by the operation of the retaining means; said blocking means, when in its blocking position, maintaining the retaining means in its operated condition; and means on the blocking means engaged by the member as the member returns to its normal position, after having been released by the operation of the retaining means, for returning the blocking means from its blocking position to enable the retaining means to return to its normal condition in cooperation with the member, whereby to insure that the member is returned to normal position before the retaining means can be effective thereon.

2. In a remotely-controlled recording device for marking on record material, the combination of recording means to make suitable marks on the record material; operating means for the recording means including a main operating spring in the device adapted to be tensioned to supply the sole source of operating power in a recording operation, a member connected to the spring and displaced from normal position when the spring is tensioned, said member having teeth thereon, and including an interponent link movable from a normal position and returned to normal position by the displaced member as the member returns to normal position, said link, when operated by the member, causing the operation of the recording means to make marks on the record material; manually operable means at the device operable preparatory to each recording operation to tension the main operating spring and displace the member from normal position; a spring-urged pawl engaging the interponent link to maintain it in normal position and also engaging the teeth on the member to prevent return movement of the member and to retain the member in its moved position and thereby retain the main operating spring under tension until a recording operation is to take place; means to move the interponent link from normal position when it is released by the pawl; an electromagnet cooperable with the pawl and operable, when energized, to shift the pawl to release the interponent link and remove the pawl from engaging relation with the member to allow the member to be driven to home position by the spring to cause an operation of the interponent link and thereby the recording means; a circuit extending to the magnet from a remote control point to enable the magnet to be energized and remove the pawl to allow the spring to drive the member to cause a recording operation, whereby the power for operating the recording means is stored in the main operating spring in the device and only sufficient power to shift the pawl from engagement with the teeth on the member need be supplied from the remote control point; and blocking means on the link cooperable with the pawl when the link is in moved position to retain the pawl out of engagement with the teeth until the member has returned to its normal position and has operated the link to restore the link to its normal position.

3. In a remotely-controlled recording device for marking on record material, the combination of recording means to print on the record material; operating means for the printing means including a main operating spring in the device adapted to be tensioned to supply the sole source of operating power in a printing operation, including a member connected to the spring and displaced from normal position when the spring is tensioned, and including printing means operating means and means to releasably couple the operating means to the member to be operated thereby during the return of the member to its normal position; manually operable means at the device operable preparatory to a printing operation to tension the spring and displace the member from normal position; means to retain the member in its moved position and thereby retain the spring under tension until a printing operation is to take place; and selectively operable means for releasing said retaining means, including a remotely-controlled electromagnet cooperable with the retaining means and operable, when energized, to remove the retaining means from engaging relation with the member to allow the member to be driven to home position by the spring to cause a printing operation and including manually operable restoring means at the recording device to release said retaining means and to uncouple the printing means operating means from the member to prevent a print from being made as the member returns to its normal position.

4. In a recording device for marking on a record, the combination of an operating means for the device, including a main operating spring in the device adapted to be tensioned to supply the sole source of operating power in a recording operation, including a member connected to the spring and displaced from normal position when the spring is tensioned, and including a recording means operating means and means to releasably couple the recording means operating means to the member to be operated thereby during the return of the member to its normal position; manually operable means at the device operable preparatory to a recording operation to tension said main operating spring and to displace said member from normal position; retaining means to retain the member in its displaced position and thereby retain the spring under tension until a recording operation is to take place; a consecutive number counter for counting the number of printing operations; counter-operating means including a releasable coupling to an arm, which arm is operated by the member to cause the counter-operating means to advance the counter one step each time the member is displaced from normal and to allow the counter-operating means to be conditioned for a further stepping movement during the return of the member to normal position; and selectively operable means to release said retaining means, including a remotely controlled electromagnet to release the retaining means to cause a recording operation and conditioning of the counter-operating means for a further count to take place and including a manually operable clearing device for releasing said retaining means and uncoupling the recording means operating means and the counter-operating means from control of the member to prevent a recording operation and further conditioning of the counter-operating means as the member and the spring are restored to unoperated condition.

5. In a remotely-controlled recording device for marking on record material, the combination of recording means including settable type wheels and means driven into engagement with the record material to cause suitable marks to be made thereon from the type wheels; operating means for the driven means of the recording means including a motor in the device adapted to be tensioned to supply the sole source of power in a recording operation, a member connected to the motor and displaced from normal position when the motor is tensioned, and an operating link movable from a normal position and returned to normal position by the member as it returns to normal position, said link, as it is returned to normal position, imparting a sharp driving movement to the driven means; means at the device to tension the motor and displace the member; means tending to move the link from normal position; latching means retaining the link in its normal position and also retaining the member in its moved position thereby maintaining the motor in its tensioned condition; an electromagnet cooperable with the latching means and operable, when energized, to move said latching means to release the link for operation from normal position by its operating means and to release the member to allow the member to be driven to normal position by the motor, said member as it returns to normal position restoring the link to impart a movement to the driven means of the recording means to cause a mark to be made on the record material; and a circuit extending from a remote control point to enable the magnet to be energized to move the latching means to enable a recording operation to take place, whereby only sufficient power to release the latching means need be supplied from the remote control point and all the power for operating the recording means to make a mark on the record material is stored in the device.

6. In a remotely-controlled recording device for marking on record material, the combination of recording means including settable type wheels and a platen operable to cause marks to be made on record material from the type wheels; operating means for the platen including a main operating spring in the device adapted to be tensioned to supply the sole source of operating power in a recording operation, a member connected to the spring and displaced from normal position when the spring is tensioned, said member having teeth thereon, and including an operating link movable from a normal position and returned to normal position by the member as it returns to normal position, said link, as it is returned to normal position, imparting a sharp driving movement to the platen to cause a recording operation; means tending to move the link from normal position; manually operable means at the device operable preparatory to each recording operation to tension the main operating spring and displace the member from normal position; a spring-urged pawl having means to retain the link in normal position and also having means to engage the teeth on the member to prevent return movement of the member and thereby retain the main operating spring under tension until a recording operation is to take place; an electromagnet cooperating with the pawl and operable, when energized, to shift the pawl to release the link for operation from normal by its operating means and to disengage the pawl from the teeth on the member to allow the member to be driven to its normal position by the spring, said member as it returns to normal position operating the link to impart driving movement to the platen to cause a mark to be made on the record material; and a circuit extending to the magnet from a remote control point and supplying only enough current necessary to enable the magnet to be energized to shift the pawl to cause a recording operation to take place, whereby all the power for operating the recording means is stored in the main operating spring when the manually operable means at the device is operated and only sufficient power to shift the pawl to release the member and the link need be supplied from the remote control point.

7. In a remotely-controlled recording device for marking on insertable record material, the combination of a chute in which record material is inserted; recording means cooperating with the chute to make suitable marks on record material which has been inserted in the chute; operating means for the recording means including motor means in the device adapted to be tensioned to supply the sole source of operating power in a recording operation; means at the device to tension the motor means preparatory to each recording operation; a switch closed by the motor means upon a complete tensioning thereof; latching means to retain the motor means in its tensioned condition; sensing means movable in said chute and operated by record material inserted therein; a switch closed under control of the sensing means when it is moved by record material properly inserted in the chute; an electromagnet cooperable with the latch and operable, when energized, to trip the latch and allow the tensioned motor means to operate; a circuit extending over the switches and the magnet in series to a remote control station to provide a signal at the control station when the motor means has been properly tensioned and the record material has been properly positioned in the chute; and manually operable means at the control station operable to modify the circuit to cause greater current to flow therein and cause the electromagnet to be energized to release the motor means to cause the operating means to operate the recording means, whereby the power for operating the recording means is derived from the motor means in the device and only sufficient power to energize the electromagnet to trip the latch need be supplied from the remote control station.

8. In a remotely-controlled recording device for marking on record material inserted in the device, the combination of a chute for receiving record material inserted in the device; recording means adjacent the chute for making suitable marks on the record material in the chute; operating means for the recording means including a motor means adapted to be tensioned to supply the sole source of operating power in a recording means; means at the device to tension the motor means preparatory to each recording operation; means cooperating with the motor means to retain the motor means in its tensioned state; a switch closed by the motor means when the motor means has been fully tensioned; feeler means extending into the chute and moved by record material properly inserted therein; a switch closed under the control of the feeler when record material is properly in position in the chute; an electromagnet cooperable with the retaining means and operable, when energized, to release said retaining means and allow the operating means to operate the recording means; a circuit including said switches and magnet, in series, and extending to a remote control point to provide a signal at the control point when the motor means has been energized and the record material is in proper recording position; and means at the control point to modify the circuit and cause the magnet to be energized and release the motor means to cause the operating means to operate the recording means, the power for operating the recording means being stored in the device and only sufficient power to release the retaining means being supplied over said circuit from the remote control point.

FRANK REGINALD SAXBY.

REFERENCES CITED

The following references are of record in the file of this patent:

UNITED STATES PATENTS

| Number | Name | Date |
|---|---|---|
| 975,533 | Kettering | Nov. 15, 1910 |
| 1,122,608 | King | Dec. 29, 1914 |
| 1,321,900 | Dorsey et al. | Nov. 18, 1919 |
| 1,372,804 | Dorsey et al. | Mar. 29, 1921 |
| 1,385,788 | Kirshner | July 26, 1921 |
| 1,644,229 | Block | Oct. 4, 1927 |
| 1,648,276 | Kern | Nov. 8, 1927 |
| 2,122,518 | Deane | July 5, 1938 |
| 2,168,763 | Daly et al. | Aug. 8, 1939 |
| 2,195,844 | Von Pein | Apr. 2, 1940 |
| 2,322,067 | Soreny | June 15, 1943 |
| 2,333,972 | Barr | Nov. 9, 1943 |